United States Patent
Zhou (10) Patent No.: US 10,770,027 B2
(45) Date of Patent: Sep. 8, 2020

(54) IMAGE COLOR CAST COMPENSATION METHOD AND DEVICE, AND DISPLAY DEVICE

(71) Applicant: BOE Technology Group Co., Ltd., Beijing (CN)

(72) Inventor: Chunmiao Zhou, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 101 days.

(21) Appl. No.: 16/308,175

(22) PCT Filed: Mar. 20, 2018

(86) PCT No.: PCT/CN2018/079584
§ 371 (c)(1),
(2) Date: Dec. 7, 2018

(87) PCT Pub. No.: WO2019/001027
PCT Pub. Date: Jan. 3, 2019

(65) Prior Publication Data
US 2020/0227001 A1  Jul. 16, 2020

(30) Foreign Application Priority Data

Jun. 27, 2017  (CN) .......................... 2017 1 0500112

(51) Int. Cl.
*G09G 5/02* (2006.01)

(52) U.S. Cl.
CPC ....... *G09G 5/02* (2013.01); *G09G 2320/0242* (2013.01)

(58) Field of Classification Search
None
See application file for complete search history.

(56) References Cited

U.S. PATENT DOCUMENTS 9,691,317 B2   6/2017 Li
2013/0077107 A1* 3/2013 Nishizawa ........... H04N 1/6061
                                                  358/1.9

(Continued)

FOREIGN PATENT DOCUMENTS

CN        101588439 A      11/2009
CN        102868892 A       1/2013

(Continued)

OTHER PUBLICATIONS

International Search Report and Written Opinion, including translation of Box V of Written Opinion, for International Application No. PCT/CN2018/079584, dated Jun. 7, 2018, 11 pages.

(Continued)

*Primary Examiner* — Duane N Taylor, Jr.
(74) *Attorney, Agent, or Firm* — Westman, Champlin & Koehler, P.A.

(57) ABSTRACT

An image color cast compensation method, an image color cast compensation device and a display device are provided. The image color cast compensation method includes: inputting a 3D reference image, driving a display panel to display the 3D reference image, and determining pixels with color cast in the 3D reference image as target pixels; with respect to each of target pixels, determining a color cast value for a to-be-displayed image corresponding to the target pixel in accordance with the 3D reference image; determining an inverted color corresponding to the color cast value in accordance with the 3D reference image, and taking the inverted color as a complementary color for the target pixel; and compensating a to-be-outputted 3D image signal in accordance with the complementary color.

20 Claims, 3 Drawing Sheets

(56) References Cited

U.S. PATENT DOCUMENTS

| | | | |
|---|---|---|---|
| 2015/0086111 A1* | 3/2015 | Iwaki | G06T 5/007 |
| | | | 382/166 |
| 2015/0255024 A1 | 9/2015 | Zhou | |
| 2016/0027360 A1 | 1/2016 | Li | |
| 2016/0253981 A1* | 9/2016 | Matsui | H04N 19/132 |
| | | | 345/690 |
| 2017/0053596 A1 | 2/2017 | Hyun et al. | |

FOREIGN PATENT DOCUMENTS

| | | |
|---|---|---|
| CN | 103165094 A | 6/2013 |
| CN | 103295557 A | 9/2013 |
| CN | 103559866 A | 2/2014 |

OTHER PUBLICATIONS

First Office Action, including Search Report, for Chinese Patent Application No. 201710500112.7, dated Jul. 29, 2019, 12 pages.
Non-patent literature document, "PHOTOSHOP", cited in the search report of the first Office Action for Chinese Patent Application No. 201710500112.7, published Sep. 30, 2016, 13 pages.

* cited by examiner

IMAGE COLOR CAST COMPENSATION METHOD AND DEVICE, AND DISPLAY DEVICE

CROSS-REFERENCE TO RELATED APPLICATION(S)

The present application is a Section 371 National Stage application of International Application No. PCT/CN2018/079584, filed on Mar. 20, 2018 which has not yet published and claims priority to Chinese patent application No. 201710500112.7 filed on Jun. 27, 2017, the contents of which are incorporated herein by reference in their entireties.

TECHNICAL FIELD

The present disclosure relates to an image color cast compensation method, an image color cast compensation device, and a display device.

BACKGROUND

Currently, three-dimensional (3D) technology has been used in some scenarios and fields. Especially, along with the improvement of the smart health display system, the 3D technology has been widely used in medical industry. For the display of medical information, how to restore an actual operating environment is very important to a viewer, especially a medical worker.

In 3D display technology of related art, color cast may occur due to such factors as a difference between a left-eye image and a right-eye image, and thereby a display effect of a 3D image may be adversely affected.

SUMMARY

In one aspect, the present disclosure provides in some embodiments an image color cast compensation method, including: inputting a 3D reference image, driving a display panel to display the 3D reference image, and determining pixels with color cast in the 3D reference image as target pixels; with respect to each target pixel, determining a color cast value for a to-be-displayed image corresponding to the target pixel in accordance with the 3D reference image; determining an inverted color corresponding to the color cast value in accordance with the 3D reference image, and taking the inverted color as a complementary color for the target pixel; and compensating a to-be-outputted 3D image signal in accordance with the complementary color.

In a possible embodiment of the present disclosure, the determining the pixels with the color cast in the 3D reference image as the target pixels includes: with respect to each pixel in a selected display region or in all display regions, detecting a display image parameter of a 3D image displayed by each subpixel of the pixel, and taking the detected display image parameter as an actual display image parameter; comparing the actual display image parameter with a reference image parameter; and when a difference between the actual display image parameter and the reference image parameter is out of a predetermined threshold range, determining the subpixel as a subpixel with the color cast and determining the pixel to which the subpixel belongs as the target pixel. The reference image parameter includes a theoretical output value adopted for driving the display panel to display the 3D reference image.

In a possible embodiment of the present disclosure, the compensating the to-be-outputted 3D image signal in accordance with the complementary color includes: acquiring a color for an image signal corresponding to the target pixel in the to-be-outputted 3D image signal as a primary color; superimposing the complementary color for the target pixel and the primary color for the target pixel; and taking a color for the image signal corresponding to the target pixel acquired after the superimposition as a color for the image signal after the color cast compensation, so as to drive the pixels to display the 3D image.

In a possible embodiment of the present disclosure, the display image parameter includes chromaticity or grayscale.

In a possible embodiment of the present disclosure, the display panel is a polarized 3D display panel.

In a possible embodiment of the present disclosure, the 3D reference image is a 3D pure-black image or a 3D pure-white image.

In another aspect, the present disclosure provides in some embodiments an image color cast compensation device, including: a pixel determination circuit configured to drive a display panel to display an inputted 3D reference image, and determine pixels with color cast in the 3D reference image as target pixels; a color cast value determination circuit configured to, with respect to each target pixel, determine a color cast value for a to-be-displayed image corresponding to the target pixel in accordance with the 3D reference image; a complementary color determination circuit configured to determine an inverted color corresponding to the color cast value in accordance with the 3D reference image, and take the inverted color as a complementary color for the target pixel; and a compensation circuit configured to compensate a to-be-outputted 3D image signal in accordance with the complementary color.

In a possible embodiment of the present disclosure, the pixel determination circuit includes: a detection sub-circuit configured to, with respect to each pixel in a selected display region or in all display regions, detect a display image parameter of a 3D image displayed by each subpixel of the pixel, and take the detected display image parameter as an actual display image parameter; a comparison sub-circuit configured to compare the actual display image parameter with a reference image parameter; and a determination sub-circuit configured to, when a difference between the actual display image parameter and the reference image parameter is out of a predetermined threshold range, determine the subpixel as a subpixel with the color cast and determine the pixel to which the subpixel belongs as the target pixel. The reference image parameter includes a theoretical output value adopted for driving the display panel to display the 3D reference image.

In a possible embodiment of the present disclosure, the compensation circuit includes: an acquisition sub-circuit configured to acquire a color for an image signal corresponding to the target pixel in the to-be-outputted 3D image signal as a primary color; a superimposition sub-circuit configured to superimpose the complementary color for the target pixel and the primary color for the target pixel; and a compensation sub-circuit configured to take a color for the image signal corresponding to the target pixel acquired after the superimposition as a color for the image signal after the color cast compensation, so as to drive the pixels to display the 3D image.

In a possible embodiment of the present disclosure, the display image parameter includes chromaticity or grayscale.

In a possible embodiment of the present disclosure, the display panel is a polarized 3D display panel.

In a possible embodiment of the present disclosure, the 3D reference image is a 3D pure-black image or a 3D pure-white image.

In yet another aspect, the present disclosure provides in some embodiments an image color cast compensation device, including one or more processors each configured to execute an instruction so as to implement one or more steps in the above-mentioned image color cast compensation method.

In a possible embodiment of the present disclosure, the image color cast compensation device further includes a memory connected to the one or more processors and configured to store therein the instruction to be executed by the one or more processors to implement one or more steps in the above-mentioned image color cast compensation method.

In still yet another aspect, the present disclosure provides in some embodiments a display device including the above-mentioned image color cast compensation device.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort. Shapes and sizes of the members in the drawings are for illustrative purposes only, but shall not be used to reflect any actual scale.

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect/connected to" or "couple/coupled to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
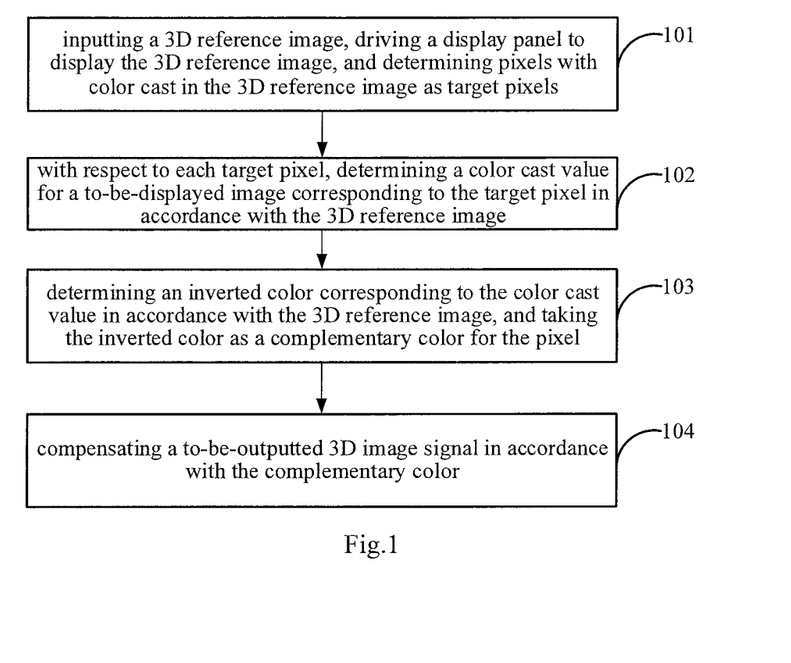
FIG. 1 is a flow chart of an image color cast compensation method according to one embodiment of the present disclosure.

As shown in FIG. 1, the present disclosure provides in some embodiments an image color cast compensation method, which includes the following steps.

Step 101: inputting a 3D reference image, driving a display panel to display the 3D reference image, and determining pixels with color cast in the 3D reference image as target pixels.

In a possible embodiment of the present disclosure, the target pixel may be determined as follows. With respect to each pixel in a selected display region or in all display regions, a display image parameter of a 3D image displayed by each subpixel of the pixel may be detected, and then the detected display image parameter may be taken as an actual display image parameter. Next, the actual display image parameter may be compared with a reference image parameter. When a difference between the actual display image parameter and the reference image parameter is out of a predetermined threshold range, the subpixel may be determined as a subpixel with the color cast, and the pixel to which the subpixel belongs may be determined as the target pixel.

In a possible embodiment of the present disclosure, the 3D reference image includes images having any known image parameters which shall be displayed theoretically.

In a possible embodiment of the present disclosure, the 3D reference image includes a pure-black or pure-white image, and the reference image parameter includes a theoretical output value adopted for driving the display panel to display the 3D reference image.

In a possible embodiment of the present disclosure, the 3D reference image includes a pure-white image, and the reference image parameter includes a maximum grayscale value of 255 for each of red (R), green (G) and blue (B) pixels.

The selected display region and the predetermined threshold may be set randomly, and the display image parameter may include chromaticity or grayscale, which will not be particularly defined herein.

In a possible embodiment of the present disclosure, the display panel may be a polarized 3D display panel. The polarized 3D display panel may display the images in an interlaced manner, so there is enough time for compensating a 3D image in a next frame.

Step 102: with respect to each target pixel, determining a color cast value for a to-be-displayed image corresponding to the target pixel in accordance with the 3D reference image.

In actual use, the color cast occurs for a displayed image after the formation of the pixels, and the color cast has no connection with the displayed image. In other words, when an image of any color is displayed by one pixel, the same color cast may occur.

In actual use, the color corresponds to the display image parameter, e.g., chromaticity, grayscale and brightness. When the chromaticity of the image displayed by the pixel is already known, it is able to acquire the corresponding grayscale, brightness and color. Hence, in a possible embodiment of the present disclosure, the color may be determined in accordance with the chromaticity, grayscale and brightness. To be specific, a colorimeter, a grayscale tester and a brightness meter may be adopted so as to detect the chromaticity, the grayscale and the brightness of each pixel in the displayed image, thereby to acquire the color and the color cast value.

In a possible embodiment of the present disclosure, a difference between the actual display image parameter and the reference image parameter may be taken as the color cast value.

Step 103: determining an inverted color corresponding to the color cast value in accordance with the 3D reference image, and taking the inverted color as a complementary color for the target pixel.

In a possible embodiment of the present disclosure, a primary color may be a color for an image signal in the to-be-outputted 3D image signal corresponding to the target pixel, and the inverted color is just inverted-color color cast of the primary color relative to the 3D reference signal.

For example, when a color, e.g., a red color with a corresponding grayscale of 170, of a certain channel (sub-pixel) of the target pixel is acquired and taken as the primary color, and a corresponding grayscale of the 3D reference image is 255, a grayscale of the inverted color may be 255−170=85.

Step 104: compensating a to-be-outputted 3D image signal in accordance with the complementary color.

For example, a color for an image signal corresponding to the target pixel in the to-be-outputted 3D image signal may be acquired as a primary color. Then, the complementary color for the target pixel and the primary color for the target pixel may be superimposed, and a color for the image signal corresponding to the target pixel acquired after the superimposition may be taken as a color for the image signal after the color cast compensation, so as to drive the pixels to display the 3D image.

In the embodiments of the present disclosure, when the color cast occurs for each target pixel of the to-be-processed 3D image, the inverted color may be determined in accordance with the color cast value, and then the inverted color may be taken as the complementary color so as to compensate the to-be-outputted 3D image signal. As a result, it is able to improve a display effect of the 3D image.

Figure 2:
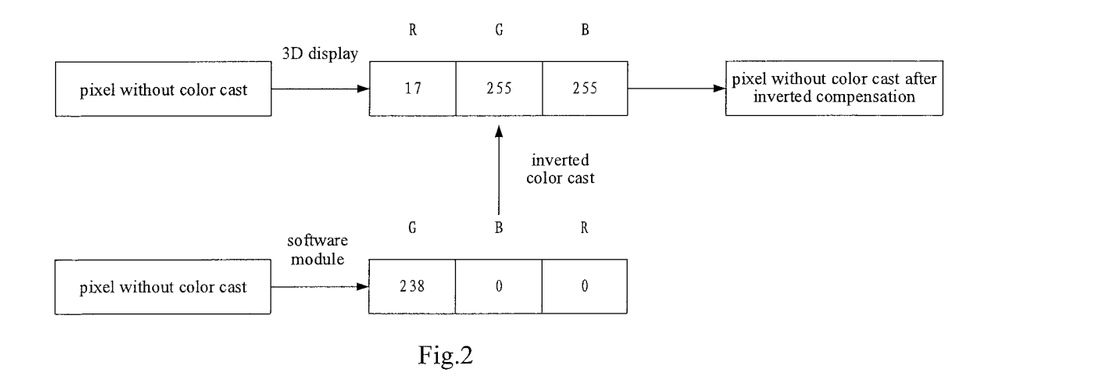
FIG. 2 is a schematic view showing the color cast compensation according to one embodiment of the present disclosure.

As shown in FIG. 2, cyan occurs at a pixel display region of bottom edge for a pixel structure CCYX, and the inverted-color color cast compensation is to be performed at a grayscale of 255. The color cast occurs for subpixels A, B and C of a target pixel, and these subpixels correspond to the image signals of red, green and blue which are set as the primary colors. Actual grayscale values of red, green and blue are 17, 255 and 255 respectively. At the selected grayscale, the R, G and B channel values for displaying a position of the target pixel may be modulated through a color matching program of software or a hardware circuit with a color matching algorithm, so as to enable a random color to be visually consistent with a displayed color. In this way, it is able to acquire the RGB channel values at a position of the pixel where the color cast occurs, and compensate the primary colors at the position of the pixel where the color cast occurs in accordance with the channel values of the inverted chromatic aberration, thereby to output a normal image without any color cast.

As mentioned above, it determines that, a grayscale value of an inverted color corresponding to red is 238 (255−17=238), a grayscale value of an inverted color corresponding to green is 0 (255−255=0), and a grayscale value of an inverted color corresponding to blue is 0 (255−255=0). During the compensation, complementary colors R (238), G (0) and B (0) may be superimposed with the primary colors of the target pixel, and the color for the image signal corresponding to the target pixel acquired after the superimposition may be taken as a color for the image signal after the color cast compensation, so as to drive the pixels to display the 3D image.

In the embodiments of the present disclosure, when the color cast occurs for the to-be-processed 3D image, the inverted-color color cast compensation may be performed on the target pixels where the color cast occurs, so as to improve the display effect of the 3D image.

In a possible embodiment of the present disclosure, the target pixel (e.g., a pixel position) and the color cast value of the target pixel may be determined, then the inverted color may be determined in accordance with the color cast value, and then the color cast compensation may be performed in accordance with the inverted color. A color compensation value corresponding to the inverted color and the pixel address of the target pixel may be stored in a chip. When an image is displayed normally and a signal source image has been acquired, a color for each pixel in the signal source image may be superimposed with the color compensation value, and the superimposed color (e.g., grayscale) may be outputted to the display panel, so as to achieve the color cast compensation for the pixel.

Figure 3:
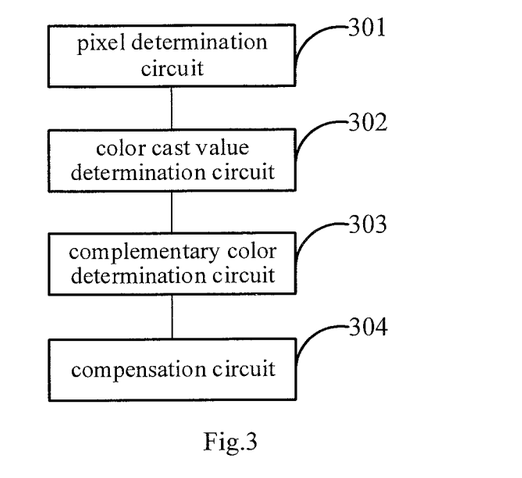
FIG. 3 is a schematic view showing an image color cast compensation device according to one embodiment of the present disclosure.

As shown in FIG. 3, the present disclosure further provides in some embodiments an image color cast compensation device, which includes: a pixel determination circuit 301 configured to drive a display panel to display a 3D reference image, and determine pixels with color cast in the 3D reference image as target pixels; a color cast value determination circuit 302 configured to, with respect to each target pixel, determine a color cast value for a to-be-displayed image corresponding to the target pixel; a complementary color determination circuit 303 configured to determine an inverted color corresponding to the color cast value, and take the inverted color as a complementary color for the target pixel; and a compensation circuit 304 configured to compensate a to-be-outputted 3D image signal in accordance with the complementary color.

Figure 4:
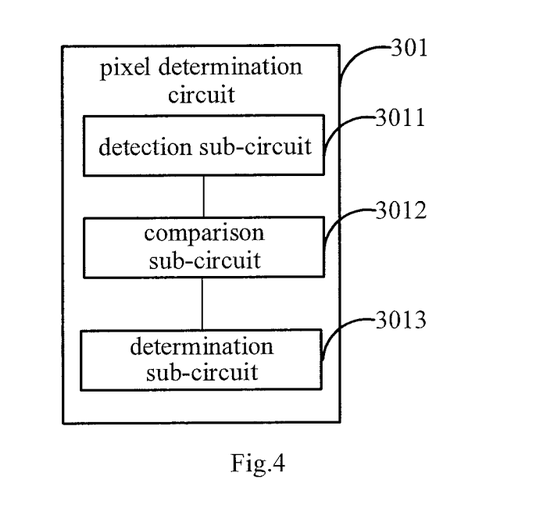
FIG. 4 is a schematic view showing a pixel determination circuit according to one embodiment of the present disclosure.

In a possible embodiment of the present disclosure, as shown in FIG. 4, the pixel determination circuit 301 includes: a detection sub-circuit 3011 configured to, with respect to each pixel in a selected display region or in all display regions, detect a display image parameter of a 3D image displayed by each subpixel of the pixel, and take the detected display image parameter as an actual display image parameter; a comparison sub-circuit 3012 configured to compare the actual display image parameter with a theoretical parameter of the reference image; and a determination sub-circuit 3013 configured to, when a difference between the actual display image parameter and the theoretical parameter of the reference image is out of a predetermined threshold range, determine the subpixel as a subpixel with the color cast and determine the pixel to which the subpixel belongs as the target pixel. The theoretical parameter of the reference image includes a theoretical output value adopted for driving the display panel to display the 3D reference image.

Figure 5:
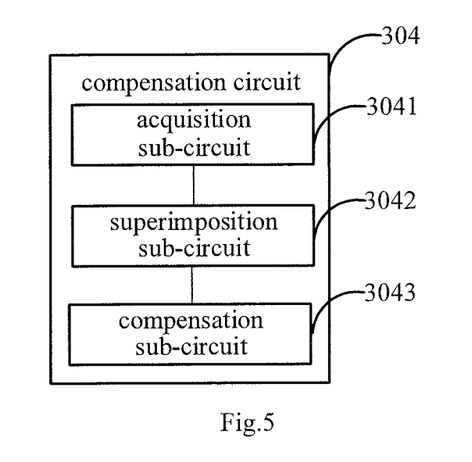
FIG. 5 is a schematic view showing a compensation circuit according to one embodiment of the present disclosure.

In a possible embodiment of the present disclosure, as shown in FIG. 5, the compensation circuit 304 includes: an acquisition sub-circuit 3041 configured to acquire a color for an image signal corresponding to the target pixel in the to-be-outputted 3D image signal as a primary color; a superimposition sub-circuit 3042 configured to superimpose the complementary color for the target pixel and the primary color for the target pixel; and a compensation sub-circuit 3043 configured to take a color for the image signal corresponding to the target pixel acquired after the superimposition as a color for the image signal after the color cast compensation, so as to drive the pixels to display the 3D image. For example, the display image parameter includes chromaticity or grayscale.

An operating principle of the image color cast compensation device may refer to the description in the above method embodiment.

In the embodiments of the present disclosure, when the color cast occurs for the target pixel in the to-be-processed 3D image, the inverted color may be determined in accordance with the color cast value, and then taken as the complementary color so as to compensate the to-be-outputted 3D image signal. As a result, it is able to improve the display effect of the 3D image.

Figure 6:
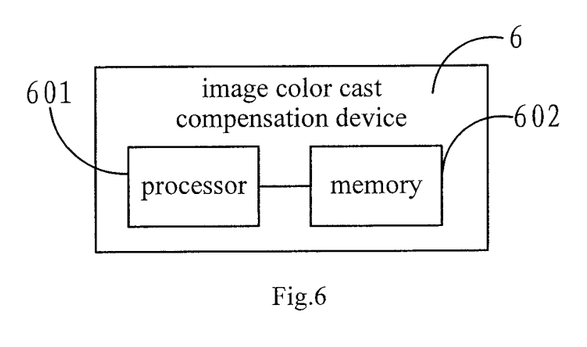
FIG. 6 is another schematic view showing the image color cast compensation device according to one embodiment of the present disclosure.

As shown in FIG. 6, the present disclosure further provides in some embodiments an image color cast compensation device 6, which includes one or more processors 601 each configured to execute an instruction so as to implement one or more steps in the above-mentioned image color cast compensation method.

In a possible embodiment of the present disclosure, the image color cast compensation device 6 further includes a memory 602 connected to the one or more processors 601 and configured to store therein the instruction to be executed by the one or more processors 601 to implement one or more steps in the above-mentioned image color cast compensation method.

The processor 601 may be any logical operation device having a data processing capability and/or a program executing capability, e.g., a Central Processing Unit (CPU), a Field Programmable Gate Array (FPGA), a Microcomputer Unit (MCU), a Digital Signal Processor (DSP), an Application Specific Integrated Circuit (ASIC) or a Graphical Processing Unit (GPU).

The memory 602 may be any volatile storage device, any nonvolatile storage device, or a combination thereof, e.g., a Static Random Access Memory (SRAM), a Read-Only Memory (ROM), a Programmable ROM (PROM), an Erasable PROM (EPROM), an Electrically EPROM (EEPROM), a magnetic memory, a flash memory, a magnetic disk or an optical disk.

The instructions include one or more operations made by the processor defined by instruction set architecture corresponding to the processor, and these instructions may be logically included and represented by one or more computer programs.

In a possible embodiment of the present disclosure, the image color cast compensation device 6 may further includes an communication unit and a transceiver which are connected to various input devices (e.g., a user interface and a keyboard), various output devices (e.g., a loudspeaker) or any other members for data and information exchange, which will not be particularly defined herein.

The present disclosure further provides in some embodiments a display device including the image color cast compensation device as shown in FIGS. 3-5 or the image color cast compensation device as shown in FIG. 6.

It should be further appreciated that, the device and method may be implemented in any other ways. For example, the embodiments for the apparatus are merely for illustrative purposes, and the circuits are provided merely on the basis of their logic functions. During the actual application, for example, some circuits may be combined together or integrated into another system. Alternatively, some features may be omitted or not executed. In addition, the coupling connection, direct coupling connection or communication connection may be implemented via interfaces, and the indirect coupling connection or communication connection between the circuits or the devices may be implemented in an electrical or mechanical form or in any other form.

In addition, the functional circuits in the embodiments of the present disclosure may be integrated into a processing circuit, or two or more functional circuits may be combined together. These circuits may be implemented in the form of hardware, or hardware plus software.

The functional circuits implemented in a software form may be stored in a computer-readable medium. The software may be stored in a storage medium and include several instructions so as to enable a computer device (a personal computer, a server or network device) to execute all or parts of the steps of the method according to the embodiments of the present disclosure.

Obviously, a person skilled in the art may make further modifications and improvements without departing from the spirit of the present disclosure, and these modifications and improvements shall also fall within the scope of the present disclosure.

What is claimed is:

1. An image color cast compensation method, comprising:
inputting a three-dimensional (3D) reference image, driving a display panel to display the 3D reference image, and determining pixels with color cast in the 3D reference image as target pixels;
with respect to each of the target pixels, determining a color cast value for a to-be-displayed image corresponding to the target pixel in accordance with the 3D reference image;
determining an inverted color corresponding to the color cast value in accordance with the 3D reference image, and taking the inverted color as a complementary color for the target pixel; and
compensating a to-be-outputted 3D image signal in accordance with the complementary color.

2. The image color cast compensation method according to claim 1, wherein the determining the pixels with the color cast in the 3D reference image as the target pixels comprises:
with respect to each pixel in a selected display region or in all display regions, detecting a display image parameter of a 3D image displayed by each subpixel of the pixel, and taking the detected display image parameter as an actual display image parameter;
comparing the actual display image parameter with a reference image parameter; and
when a difference between the actual display image parameter and the reference image parameter is out of a predetermined threshold range, determining the subpixel as a subpixel with the color cast and determining the pixel to which the subpixel belongs as the target pixel,
wherein the reference image parameter comprises a theoretical output value adopted for driving the display panel to display the 3D reference image.

3. The image color cast compensation method according to claim 1, wherein the compensating the to-be-outputted 3D image signal in accordance with the complementary color comprises:

acquiring a color for an image signal corresponding to the target pixel in the to-be-outputted 3D image signal as a primary color;

superimposing the complementary color for the target pixel and the primary color for the target pixel; and taking a color for the image signal corresponding to the target pixel acquired after the superimposition as a color for the image signal after the color cast compensation, to drive the pixels to display the 3D image.

4. The image color cast compensation method according to claim 2, wherein the display image parameter comprises chromaticity or grayscale.

5. The image color cast compensation method according to claim 1, wherein the display panel is a polarized 3D display panel.

6. The image color cast compensation method according to claim 1, wherein the 3D reference image is a pure-black image or a pure-white image.

7. An image color cast compensation device, comprising:

a pixel determination circuit configured to drive a display panel to display an inputted 3D reference image, and determine pixels with color cast in the 3D reference image as target pixels;

a color cast value determination circuit configured to, with respect to each of the target pixels, determine a color cast value for a to-be-displayed image corresponding to the target pixel in accordance with the 3D reference image;

a complementary color determination circuit configured to determine an inverted color corresponding to the color cast value in accordance with the 3D reference image, and take the inverted color as a complementary color for the target pixel; and a compensation circuit configured to compensate a to-be-outputted 3D image signal in accordance with the complementary color.

8. The image color cast compensation device according to claim 7, wherein the pixel determination circuit comprises:

a detection sub-circuit configured to, with respect to each pixel in a selected display region or in all display regions, detect a display image parameter of a 3D image displayed by each subpixel of the pixel, and take the detected display image parameter as an actual display image parameter;

a comparison sub-circuit configured to compare the actual display image parameter with a reference image parameter; and a determination sub-circuit configured to, when a difference between the actual display image parameter and the reference image parameter is out of a predetermined threshold range, determine the subpixel as a subpixel with the color cast and determine the pixel to which the subpixel belongs as the target pixel, wherein the reference image parameter comprises a theoretical output value adopted for driving the display panel to display the 3D reference image.

9. The image color cast compensation device according to claim 7, wherein the compensation circuit comprises:

an acquisition sub-circuit configured to acquire a color for an image signal corresponding to the target pixel in the to-be-outputted 3D image signal as a primary color;

a superimposition sub-circuit configured to superimpose the complementary color for the target pixel and the primary color for the target pixel; and a compensation sub-circuit configured to take a color for the image signal corresponding to the target pixel acquired after the superimposition as a color for the image signal after the color cast compensation, to drive the pixels to display the 3D image.

10. The image color cast compensation device according to claim 8, wherein the display image parameter comprises chromaticity or grayscale.

11. The image color cast compensation device according to claim 7, wherein the display panel is a polarized 3D display panel.

12. The image color cast compensation device according to claim 7, wherein the 3D reference image is a pure-black image or a pure-white image.

13. An image color cast compensation device, comprising:

one or more processors;

a memory, wherein the memory is connected to the one or more processors, and configured to store therein an instruction to be executed by the one or more processors, and each of the processors is configured to read and execute the instruction stored in the memory to input a 3D reference image, drive a display panel to display the 3D reference image, and determine pixels with color east in the 3D reference image as target pixels;

with respect to each of the target pixels, determine a color cast value for a to-be-displayed image corresponding to the target pixel in accordance with the 3D reference image;

determine an inverted color corresponding to the color east value in accordance with the 3D reference image, and take the inverted color as a complementary color for the target pixel; and compensate a to-be-outputted 3D image signal in accordance with the complementary color.

14. A display device comprising the image color cast compensation device according to claim 7.

15. The image color cast compensation device according to claim 13, wherein each of the processors is configured to read and execute the instruction stored in the memory to:

with respect to each pixel in a selected display region or in all display regions, detect a display image parameter of a 3D image displayed by each subpixel of the pixel, and take the detected display image parameter as an actual display image parameter;

compare the actual display image parameter with a reference image parameter; and when a difference between the actual display image parameter and the reference image parameter is out of a predetermined threshold range, determine the subpixel as a subpixel with the color cast and determine the pixel to which the subpixel belongs as the target pixel, wherein the reference image parameter comprises a theoretical output value adopted for driving the display panel to display the 3D reference image.

16. The image color cast compensation device according to claim 13, wherein each of the processors is configured to read and execute the instruction stored in the memory to:

acquire a color for an image signal corresponding to the target pixel in the to-be-outputted 3D image signal as a primary color;

superimpose the complementary color for the target pixel and the primary color for the target pixel; and take a color for the image signal corresponding to the target pixel acquired after the superimposition as a color for the image signal after the color cast compensation, to drive the pixels to display the 3D image.

17. The image color cast compensation device according to claim 15, wherein the display image parameter comprises chromaticity or grayscale.

18. The image color cast compensation device according to claim 13, wherein the display panel is a polarized 3D display panel.

19. The image color cast compensation device according to claim 13, wherein the 3D reference image is a pure-black image or a pure-white image.

20. The display device according to claim 14, wherein the pixel determination circuit comprises:
   a detection sub-circuit configured to, with respect to each pixel in a selected display region or in all display regions, detect a display image parameter of a 3D image displayed by each subpixel of the pixel, and take the detected display image parameter as an actual display image parameter;
   a comparison sub-circuit configured to compare the actual display image parameter with a reference image parameter; and
   a determination sub-circuit configured to, when a difference between the actual display image parameter and the reference image parameter is out of a predetermined threshold range, determine the subpixel as a subpixel with the color cast and determine the pixel to which the subpixel belongs as the target pixel,
   wherein the reference image parameter comprises a theoretical output value adopted for driving the display panel to display the 3D reference image.

* * * * *